(12) United States Patent
Odawara et al.

(10) Patent No.: US 7,241,997 B2
(45) Date of Patent: Jul. 10, 2007

(54) SUPERCONDUCTING X-RAY DETECTION APPARATUS AND SUPERCONDUCTING X-RAY ANALYZER USING THE APPARATUS

(75) Inventors: Akikazu Odawara, Chiba (JP); Satoshi Nakayama, Chiba (JP); Keiichi Tanaka, Chiba (JP)

(73) Assignee: SII NanoTechnology Inc. (JP)

( * ) Notice: Subject to any disclaimer, the term of this patent is extended or adjusted under 35 U.S.C. 154(b) by 195 days.

(21) Appl. No.: 11/032,801

(22) Filed: Jan. 11, 2005

(65) Prior Publication Data

US 2005/0184238 A1    Aug. 25, 2005

(30) Foreign Application Priority Data

Jan. 29, 2004    (JP)    ............................. 2004-021670

(51) Int. Cl.
*H01L 27/18*    (2006.01)
*H01L 39/00*    (2006.01)

(52) U.S. Cl. .................................... 250/336.2; 505/160

(58) Field of Classification Search ............. 250/336.2; 505/160, 163, 181
See application file for complete search history.

(56) References Cited

U.S. PATENT DOCUMENTS

2006/0102842 A1*    5/2006    Hoehne .................. 250/336.2

FOREIGN PATENT DOCUMENTS

DE    10317888 B3 *    12/2004

* cited by examiner

*Primary Examiner*—David Porta
*Assistant Examiner*—David S. Baker
(74) *Attorney, Agent, or Firm*—Adams & Wilks

(57) ABSTRACT

A superconducting X-ray detection apparatus has a refrigerator, a cooling head cooled by the refrigerator, and a stacked structure connected to an end portion of the cooling head. The stacked structure comprises a sensor holder, a low-temperature first-stage amplifier connected to the sensor holder, and a superconducting X-ray detector mounted on the low-temperature first-stage amplifier.

14 Claims, 3 Drawing Sheets

SUPERCONDUCTING X-RAY DETECTION APPARATUS AND SUPERCONDUCTING X-RAY ANALYZER USING THE APPARATUS

BACKGROUND OF THE INVENTION

1. Field of the Invention

The present invention relates to a superconducting X-ray detection apparatus having a highly sensitive superconducting X-ray detector produced using a superconductive material, and to a method for mounting a low-temperature first-stage amplifier for amplifying a feeble signal output from the detector. The present invention also relates to a superconducting X-ray analyzer equipped with the superconducting X-ray detection apparatus.

2. Background Art

Recently, superconducting X-ray detectors called TES (Transition Edge Sensor) or STJ (Superconducting Tunnel Junction) have been developed. Currently, study on systemization of the superconducting X-ray detectors is made for meeting various requirements because of their high sensitivity and high energy resolution compared with conventional X-ray detectors. Since each of the superconducting X-ray detectors is a device utilizing superconduction, it needs to be cooled to a low temperature to be driven. Since drive at a lower temperature provides reduction in influence of thermal noise and expectable improvement in performance, the detectors are typically cooled to a very low temperature of about 100 mK.

TES is a temperature sensor utilizing change of a resistance value occurred when a material in a superconducting state transits into a normal conduction state following temperature rise, and is an X-ray sensor that converts energy of X-ray irradiation into heat and thus performs the detection. When a working point is fixed to a superconducting transition edge by applying appropriate bias current, abrupt temperature rise occurs when X-ray is irradiated on the TES, resulting in change of resistance. Since a current value flowing into the TES changes due to the resistance change, X-ray can be detected by monitoring the current value. Since the change of the current following the X-ray irradiation is feeble, several picoamperes, a SQUID array is typically used for signal amplification.

As a main application of the superconducting X-ray detector, an X-ray analyzer and a cosmic-ray detection apparatus are given. When used in the X-ray analyzer, for example, the superconducting X-ray detector is used in combination with a scanning electron microscopy (SEM). The superconducting X-ray detector is inserted into a sample room of the SEM, which is maintained in vacuum environment, at a normal temperature.

The detector needs to be placed near a sample to improve X-ray detection efficiency. X-ray generated from the sample by an electron beam irradiation is detected by the superconducting X-ray detector.

Near the sample, in addition to a sample stage for placing the sample, a lens barrel comprising an electron gun for irradiating an electron beam and an electron lens for focusing the electron beam, and a secondary electron detector for detecting electrons generated from the sample are placed, therefore a space for placing a refrigerator for cooling the superconducting X-ray detector to 100 mK or lower can not be secured. Therefore, the refrigerator is provided separately from the SEM, a cooling head is provided in a thin cylinder called snout constructed in a heat insulation structure, and the superconducting X-ray detector is fixed to an end of the cooling head. The sample is placed near the superconducting X-ray analyzer by inserting the snout from a port of the sample room of the SEM.

FIG. 5 shows a structure of an end portion of a conventional superconducting X-ray detection apparatus (for example, see non-patent literature 1). The end portion mainly comprises an outer layer of a snout 102 for maintaining vacuum, a radiation-heat shield plate 70 in about two layers for shielding radiation heat, a cooling head 103 for mounting the detector, and a super-insulation 80 applied to inner and outer layers of the radiation-heat shield plate 70. The outer layer of the snout 102 and the radiation-heat shield plate 70 have a certain thickness, and an appropriate interval is necessary, therefore even if the snout has a diameter of about 30 mm, diameter of the cooling head is small, about 10 mm.

A superconducting X-ray detector 10 such as TES is adhered to a sensor holder 30 produced using a material having high heat conductivity such as oxygen free copper or sapphire together with a connection pad 40, and mounted on an end section portion of the cooling head 30 by a screw clamp.

A low-temperature first-stage amplifier 20 is adhered to an amplifier holder 21 produced using the same material as the sensor holder 30 together with a connection pad 41, and mounted on the side near the end of the cooling head 30.

The superconducting X-ray detector 10 is connected to the connection pad 40 by wire bonding. Among electrodes of the connection pad 40, an output terminal of the superconducting X-ray detector 10 is connected to the connection pad 41 on the amplifier holder 21 using a lead, and as wiring for driving the superconducting X-ray detector 10, connection is made to a connector attached to outer packaging of the refrigerator using a lead.

On the other hand, the low-temperature first-stage amplifier 20 is connected to the connection pad 41 by the wire bonding. Among electrodes of the connection pad 41, an electrode for driving the low-temperature first-stage amplifier 20 is connected to a connector attached to the outer packaging of the refrigerator using a lead.

[Non-Patent Literature 1]

Y. Ishisaki, et al. "Proceeding of the Society of Photo-Optical Instrumentation Engineers (SPIE)", Hawaii U.S., 2002, p831.

In the conventional superconducting X-ray detection apparatus, there has been a problem that since there is no space except for the space for mounting the superconducting X-ray detector, the low-temperature first-stage amplifier that amplifies an output signal from the detector is placed distantly from the detector, and the detector is connected to the amplifier using the lead having high electric conductivity, therefore wiring length is large, the output from the detector that is the feeble signal is influenced by disturbance noise. Furthermore, there has been a problem that handling performance is bad because connection of wiring is complicated.

The present invention overcomes the problems in the conventional art by providing a superconducting X-ray detection apparatus having a structure where the influence of the disturbance noise on the output from the detector is minimized by placing the detector and the amplifier in a same place and by providing a mounting method in which the connection of wiring can be easily made.

SUMMARY OF THE INVENTION

To solve the foregoing problems in the conventional art, the superconducting X-ray detection apparatus of the invention comprises a refrigerator, a cooling head cooled by the refrigerator, a superconducting X-ray detector, a sensor holder, and low-temperature first-stage amplifier fixed on an end portion of the cooling head. The superconducting X-ray detector is mounted in three dimensions on the low-temperature first-stage amplifier to form a stacked structure.

In addition, in the superconducting X-ray analyzer of the invention, the low-temperature first-stage amplifier and the superconducting X-ray detector of the superconducting X-ray detection apparatus are mounted and fixed in a stacked manner on the sensor holder provided on the end portion of the cooling head cooled by the refrigerator, and X-ray generated from a sample irradiated with an electron beam is detected and analyzed. Furthermore, in the superconducting X-ray detection apparatus and the superconducting X-ray analyzer of the invention, when the superconducting X-ray detector and the low-temperature first-stage amplifier are formed into the stacked structure, a superconductive member can be inserted between the detector and the amplifier. In this case, it is preferable that a member for mounting the amplifier is also prepared using a superconductive material.

According to the superconducting X-ray detection apparatus and the superconducting X-ray analyzer configured as above, since the superconducting X-ray detector and the low-temperature first-stage amplifier are formed to be the stacked structure, a connection pad of the detector is close to a connection pad of the amplifier, therefore they can be easily connected by the wire bonding, resulting in reduced wiring length.

Furthermore, the superconductive material is inserted between the detector and the amplifier, thereby external magnet noise that causes degradation in characteristics of the amplifier is shielded, and it can be prevented that a magnetic field generated by driving current of the amplifier is coupled with the superconducting X-ray detector and thus deteriorates the characteristics of the detector.

Furthermore, the superconductive material is also inserted on a surface of the holder for mounting the amplifier, thereby since a structure where the amplifier is wrapped by the superconductive material is formed, the effect of shielding the magnetic noise to the amplifier is improved.

The invention having the construction and operation as described above exhibits the following advantages. Since reduction in footprint can be designed by forming the superconducting X-ray detector and the low-temperature first-stage amplifier as a stacked structure, the detector can be mounted near the amplifier and thus connected thereto by wire bonding, therefore the length of the wiring is decreased, an influence of the disturbance noise can be reduced, and the handling performance is improved.

Furthermore, the superconductive material is inserted between the detector and the amplifier, thereby the amplifier can be subjected to superconductive shield, the external magnetic noise can be prevented from being coupled with the amplifier, and the magnetic field generated by the driving current of the amplifier can be prevented from being coupled with the superconducting X-ray detector, therefore stable detection and analysis of the X-ray can be performed.

Furthermore, the superconductive material is inserted between the amplifier and the holder for holding the amplifier, thereby an effect of reducing the influence of the external magnetic noise on the amplifier is increased, and stable operation as the amplifier can be achieved, therefore the stable detection and analysis of the X-ray can be performed.

DETAILED DESCRIPTION OF THE PREFERRED EMBODIMENTS

Embodiments of the invention are described with reference to drawings.

Embodiments

Figure 1:
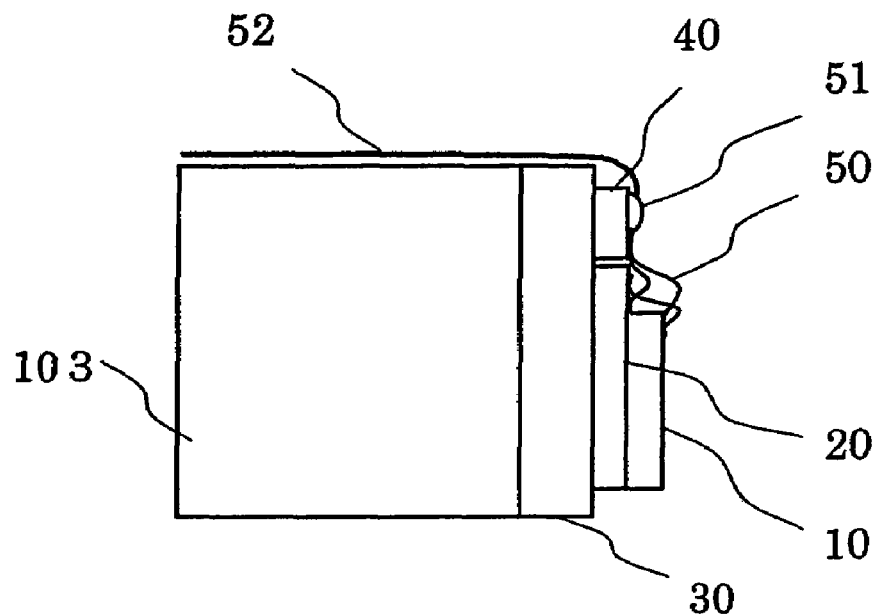
FIG. 1 is a schematic view showing an embodiment of an end portion of a superconducting X-ray detection apparatus according to the invention.

FIG. 1 is a schematic view showing an embodiment of a superconducting X-ray detection apparatus according to the invention. A low-temperature first-stage amplifier 20 was adhered to a sensor holder 30 using varnish, and a superconducting X-ray detector 10 was adhered on the low-temperature first-stage amplifier 20 using the varnish.

A TES (Transition Edge Sensor) was used as the superconducting X-ray detector 10, and a SQUID array in which 250 SQUIDs were connected in series was used as the low temperature first stage amplifier 20. All wiring to the superconducting X-ray detector 10 and the low-temperature first stage amplifier 20 was made using bonding wire 50. Connection between the superconducting X-ray detector 10 and the low-temperature first-stage amplifier 20 was made by direct bonding. Wiring for connecting between a room temperature circuit system and the superconducting X-ray detector 10 or the low-temperature first-stage amplifier 20 was made via a connection pad 40, connection between the connection pad 40 and the superconducting X-ray detector 10 or the low-temperature first-stage amplifier 20 was made by bonding, and connection from the connection pad 40 to the room-temperature circuit system was made using wiring 52.

Although a copper wire having high conductivity was used for the wiring 52, in some cases, a niobium titanium wire that is a superconductive wire, a Manganin wire that prevents heat penetration from room temperature, or a stainless steel wire can be used. The sensor holder 30 is mounted on a cooling head 103 provided in the snout of the refrigerator by the screw clamp, thereby the superconducting X-ray detector 10 and the low-temperature first-stage amplifier 20 are cooled to about 100 mK to drive them as a highly sensitive X-ray detector. The sensor holder 30 was produced using the high-purity oxygen-free copper or sapphire as a material.

Figure 2:
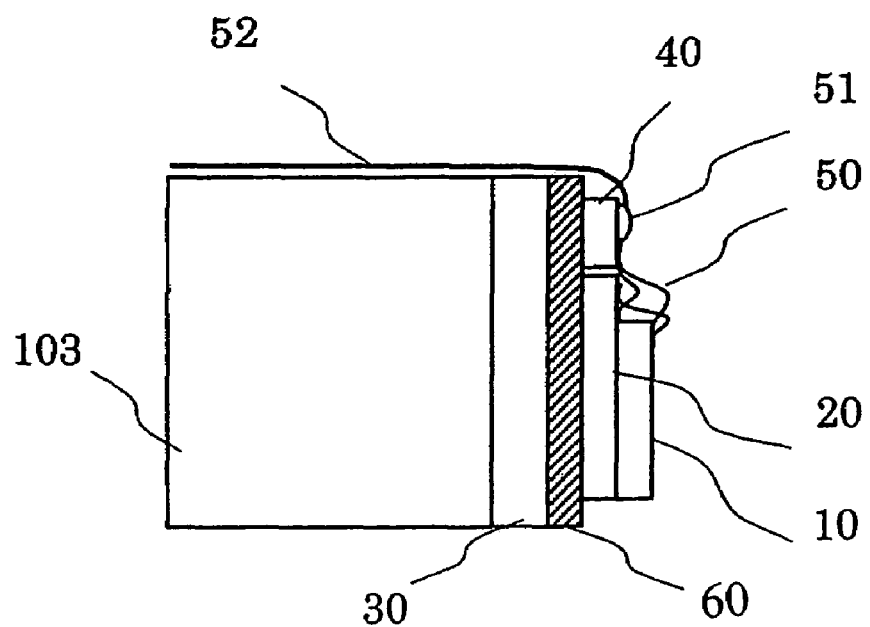
FIG. 2 is a schematic view showing another embodiment of an end portion of a superconducting X-ray detection apparatus according to the invention.
Figure 3:
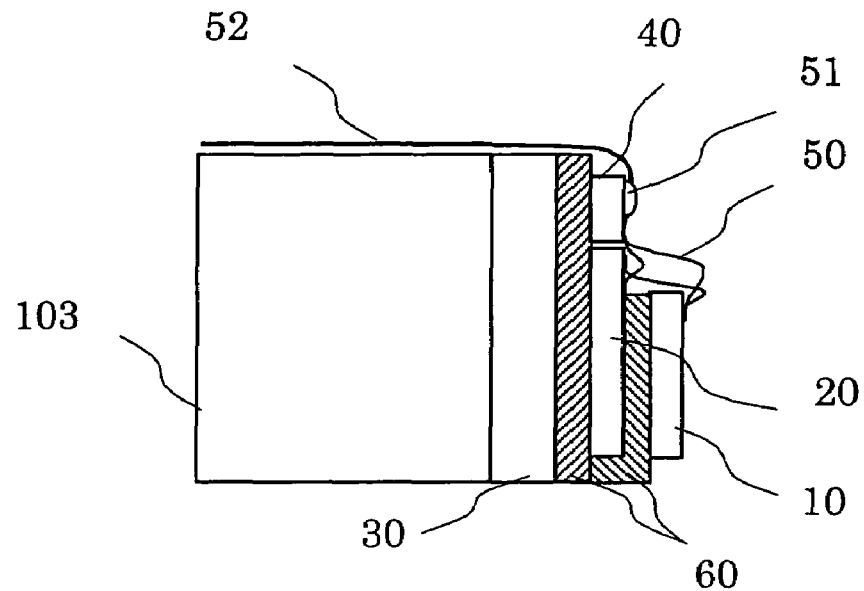
FIG. 3 is a schematic view showing another embodiment of an end portion of a superconducting X-ray detection apparatus according to the invention.

In an embodiment as shown in FIG. 2, a superconductive member 60 was inserted between the sensor holder 30 and the low-temperature first-stage amplifier 20. Although an aluminum foil 10 film in thickness was used as a material for the superconductive member 60, other superconductive materials can be used as long as they have the critical temperature of a temperature or more at which the detector is driven. In a method for placing the superconductive member 60, varnish having high heat conductivity was used for adhesion. In an embodiment as shown in FIG. 3, in addition to the embodiment as shown in FIG. 2, a superconductive foil 60 was inserted between the superconducting X-ray detector 10 and the low-temperature first-stage amplifier 20, and then adhered thereto using the varnish.

Figure 4:
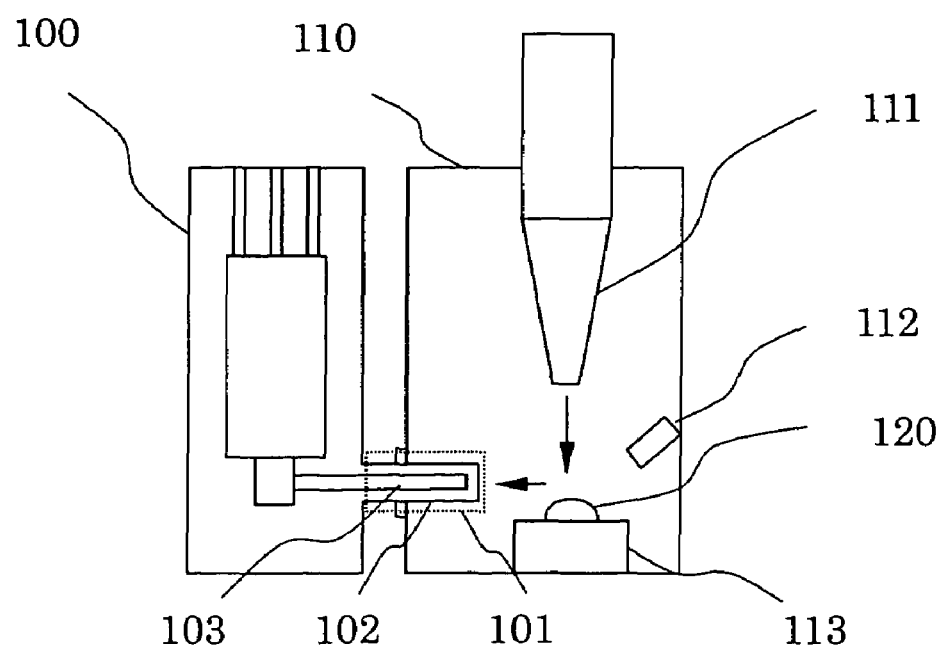
FIG. 4 is a schematic view showing a configuration of the superconducting X-ray detection apparatus according to the invention.
Figure 5:
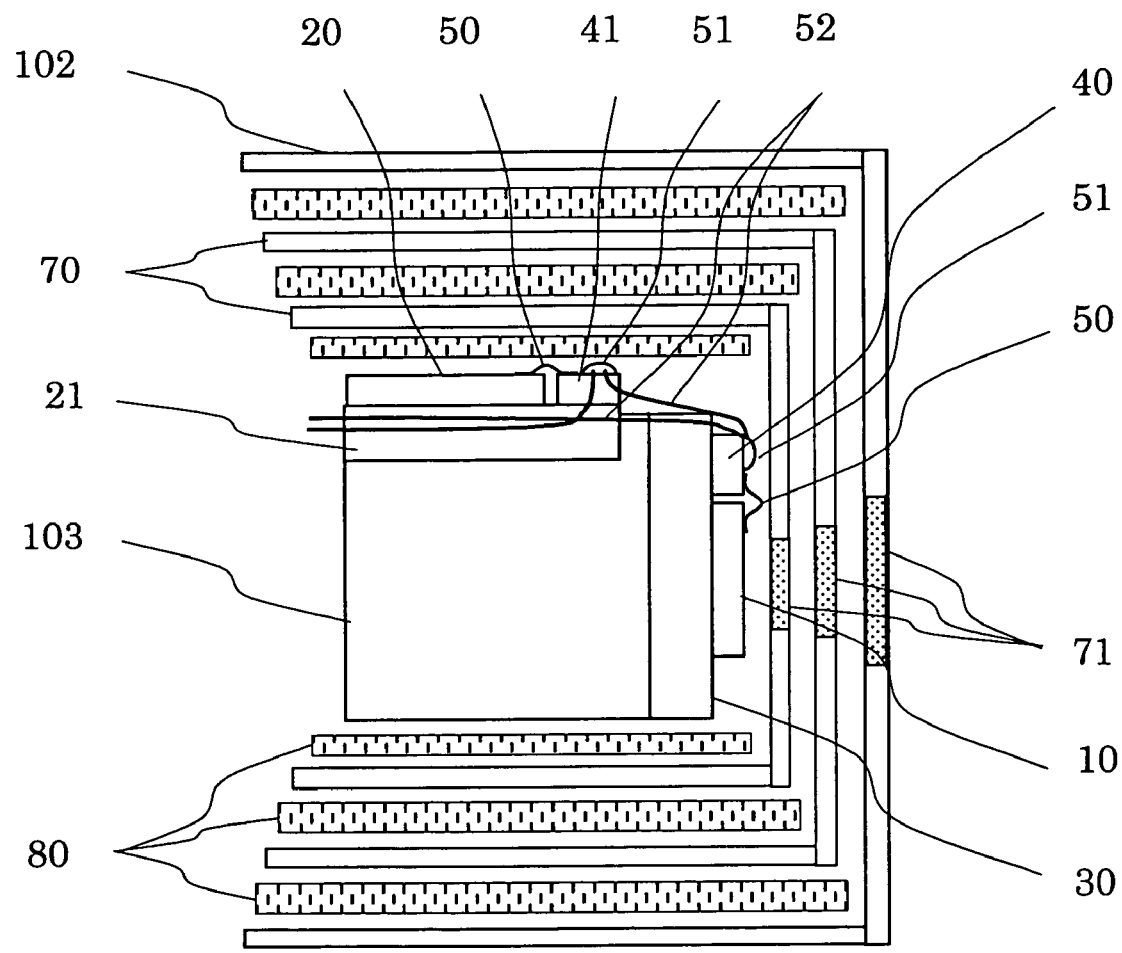
FIG. 5 is a schematic view showing a structure of an end portion of a conventional superconducting X-ray detection apparatus.

FIG. 4 is a schematic view showing a configuration of the superconducting X-ray detection apparatus according to the invention. The superconducting X-ray detector was fixed to an end portion of the cooling head 103, and inserted into a sample room of the SEM, which is maintained in the vacuum environment, at the normal temperature. X-ray generated from a sample 120 by irradiation of an electron beam emitted from a lens barrel 111 of an electron microscopy system is detected by the superconducting X-ray detector. The superconducting X-ray detector needs to be placed close to the sample 120 for improving efficiency of detecting the X-ray. Near the sample 120, in addition to a sample stage 113 for placing the sample, the lens barrel 111 comprising the electron gun for irradiating the electron beam and the electron lens for focusing the electron beam, and a secondary electron detector 112 for detecting electrons generated from the sample 120 are placed.

A refrigerator 100 is provided separately from the SEM to cool the superconducting X-ray detector, the cooling head 103 is provided in a snout 101 constructed in the heat insulation structure, and the superconducting X-ray detector is fixed to the end of the cooling head. The snout 101 is inserted through a port of a sample room 110 of the SEM, thereby placing the sample 120 close to the superconducting X-ray detector.

The low-temperature first-stage amplifier is fixed to the sensor holder provided on the end portion of the cooling head 103, and the superconducting X-ray detector is mounted thereon in a stacked manner. In this case, the superconductive member can be inserted between the superconducting X-ray detector and the low-temperature first-stage amplifier. It can be configured that the superconductive member is inserted between the low-temperature first-stage amplifier and the sensor holder.

What is claimed is:

1. A superconducting X-ray detection apparatus comprising: a refrigerator; a cooling head cooled by the refrigerator and a stacked structure connected to an end portion of the cooling head, the stacked structure comprising a sensor holder, a low-temperature first-stage amplifier connected to the sensor holder, and a superconducting X-ray detector mounted on the low-temperature first-stage amplifier.

2. A superconducting X-ray detection apparatus according to claim 1; further comprising a superconductive member disposed between the sensor holder and the low-temperature first-stage amplifier.

3. A superconducting X-ray detection apparatus according to claim 1; further comprising a superconductive member disposed between the superconducting X-ray detector and the low-temperature first-stage amplifier.

4. A superconducting X-ray detection apparatus according to claim 2; wherein the superconductive member comprises a superconductive foil.

5. A superconducting X-ray apparatus according to claim 3; wherein the superconductive member comprises a superconductive foil.

6. A superconducting X-ray analyzer comprising: an electron microscopy system having an electron beam source for irradiating a sample with an electron beam; and a superconducting X-ray detection apparatus according to claim 1 for detecting X-rays generated from the sample irradiated with the electron beam.

7. A superconducting X-ray analyzer according to claim 6; further comprising a superconductive member disposed between the sensor holder and the low-temperature first-stage amplifier of the detection apparatus.

8. A superconductor X-ray analyzer according to claim 6; further comprising a superconductive member disposed between the superconducting X-ray detector and the low-temperature first-stage amplifier.

9. A superconducting X-ray analyzer according to claim 7; wherein the superconductive member comprises a superconductive foil.

10. A superconducting X-ray analyzer according to claim 8; wherein the superconductive member comprises a superconductive foil.

11. A superconducting X-ray detection apparatus comprising: a cooling head; and a stacked structure connected to an end portion of the cooling head, the stacked structure comprising a superconducting X-ray detector, a low-temperature first-stage amplifier, and a superconductive member disposed between the superconducting X-ray detector and the low-temperature first-stage amplifier.

12. A superconducting X-ray detection apparatus according to claim 11; wherein the superconductive member comprises a superconductive foil.

13. A superconducting X-ray detection apparatus according to claim 11; further comprising a sensor holder disposed between the cooling head and the low-temperature first-stage amplifier.

14. A superconducting X-ray analyzer comprising: an electron microscopy system having an electron beam source for irradiating a sample with an electron beam; and a superconducting X-ray detection apparatus according to claim 11 for detecting X-rays generated from the sample irradiated with the electron beam.

* * * * *